US007986328B2

(12) United States Patent
Taghavi et al.

(10) Patent No.: US 7,986,328 B2
(45) Date of Patent: Jul. 26, 2011

(54) GRAPHICS OPTIMIZATION SYSTEM AND METHOD

(75) Inventors: Hamid Taghavi, Aliso Viego, CA (US); Pamela Taylor, Orange, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1701 days.

(21) Appl. No.: 10/787,997

(22) Filed: Feb. 26, 2004

(65) Prior Publication Data

US 2005/0190178 A1    Sep. 1, 2005

(51) Int. Cl.
G09G 5/00    (2006.01)
G06T 1/00    (2006.01)
(52) U.S. Cl. ........................................ 345/581; 345/418
(58) Field of Classification Search .................. None
See application file for complete search history.

(56) References Cited

U.S. PATENT DOCUMENTS

| 5,777,621 | A | 7/1998 | Schneider et al. |
| 5,936,641 | A | 8/1999 | Jain et al. |
| 6,400,841 | B1* | 6/2002 | Khoury .......................... 382/154 |
| 6,631,423 | B1 | 10/2003 | Brown et al. |
| 6,658,564 | B1 | 12/2003 | Smith et al. |
| 2004/0130680 | A1* | 7/2004 | Zhou et al. ...................... 352/38 |
| 2004/0236843 | A1* | 11/2004 | Wing et al. .................... 709/219 |
| 2005/0041032 | A1* | 2/2005 | Hill et al. ....................... 345/556 |

OTHER PUBLICATIONS

"3DMark03—Next Generation 3D Benchmarking", White Paper, Maneesh Dhagat, Feb. 11, 2003, FutureMark Corp.*
"The Hardware Reviewer's Guide for 3DMark(R)03", FutureMark Corp, Dec. 9, 2003.*

* cited by examiner

Primary Examiner — Daniel F Hajnik

(57) ABSTRACT

A graphics optimization system comprises a graphics application adapted to render a data model for presentation via a graphics card using a plurality of different data rendering settings. The system also comprises an optimizer adapted to interface with the graphics application to automatically determine a time-optimized data rendering setting for the graphics application from the plurality of different data rendering settings.

66 Claims, 3 Drawing Sheets

GRAPHICS OPTIMIZATION SYSTEM AND METHOD

TECHNICAL FIELD

The present invention relates generally to the field of computer systems and, more particularly, to a graphics optimization system and method.

BACKGROUND

Computer graphics systems are used for displaying two- and three-dimensional representations of an object. Generally, an object or model to be represented is broken down into graphics primitives which are basic components of a graphics display (i.e., points, lines, triangles, quadrilaterals, triangles, and polygons). A combination of a graphics software application and graphics card is used to render the graphics primitives that represent a view of one or more objects.

A variety of different graphics application configurations or settings may be used to render graphics primitives. Additionally, a variety of graphics application/graphics card combinations may be used to render graphics primitives. However, different graphics application/graphics card combinations and/or different graphics application settings provide different performance results. Further, particular graphics applications and/or graphics cards provide different performance results based on attributes associated with particular data models. Thus, manually determining graphics rendering performance optimization is generally a difficult and time-consuming process because of the quantity of different rendering settings generally available, the quantity of different graphics application/graphics card combinations, and the different rendering response times based on data model attributes.

SUMMARY

In accordance with one embodiment of the present invention, a graphics optimization system comprises a graphics application adapted to render a data model for presentation via a graphics card using a plurality of different data rendering settings. The system also comprises an optimizer adapted to interface with the graphics application to automatically determine a time-optimized data rendering setting for the graphics application from the plurality of different data rendering settings.

In accordance with another embodiment of the present invention, a graphics optimization method comprises instructing a graphics application to render a data model for presentation via a graphics card using a plurality of different data rendering settings. The method also comprises automatically determining a time-optimized data rendering setting for the graphics application from the plurality of different data rendering settings.

In accordance with another embodiment of the present invention, a graphics optimization system comprises an interface adapted to receive from a user at least one data rendering variable associated with rendering a data model via a graphics application. The system also comprises an optimizer adapted to automatically determine a time-optimized data rendering setting for the graphics application based on the data rendering variable.

In accordance with yet another embodiment of the present invention, a computer-readable medium has stored thereon an instruction set to be executed such that the instruction set, when executed by a processor, causes the processor to instruct a graphics application to render a data model for presentation via a graphics card using a plurality of different data rendering settings and automatically determine a time-optimized data rendering setting for the graphics application from the plurality of different data rendering settings.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
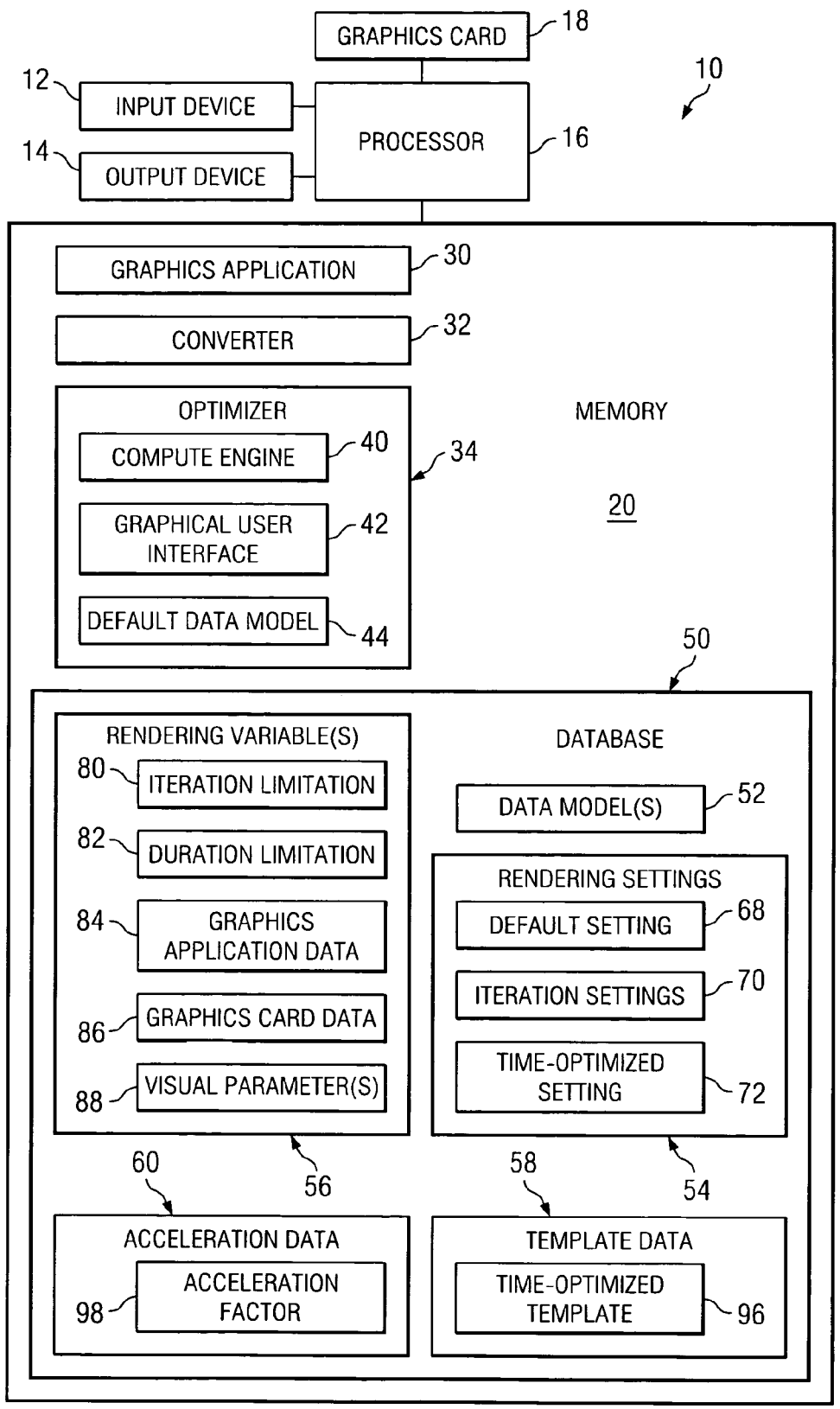
FIG. 1 is a diagram illustrating an embodiment of a graphics optimization system in accordance with the present invention.
Figure 2A:
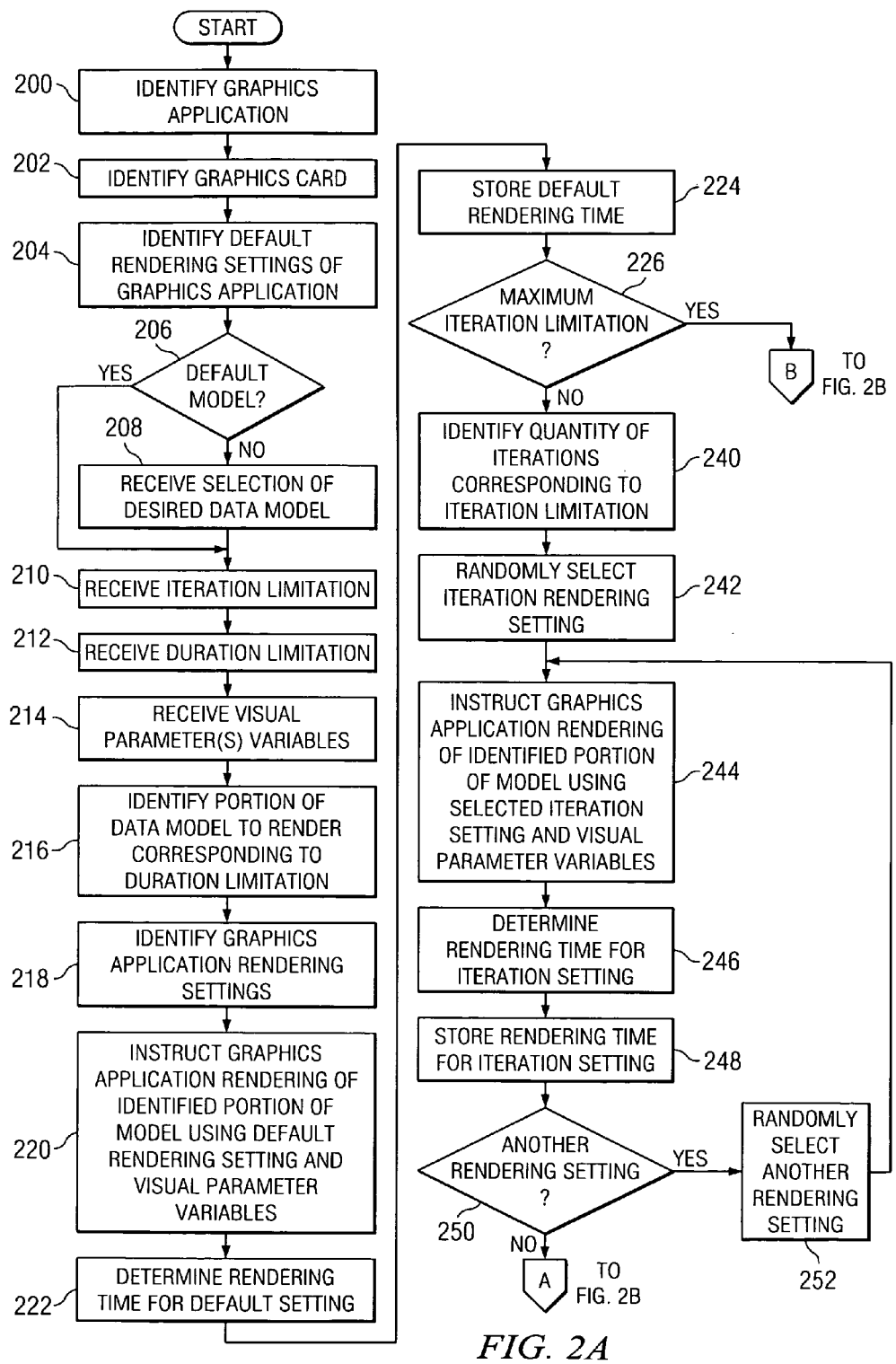
FIG. 2 is a flow chart illustrating an embodiment of a graphics optimization method in accordance with the present invention.
Figure 2B:
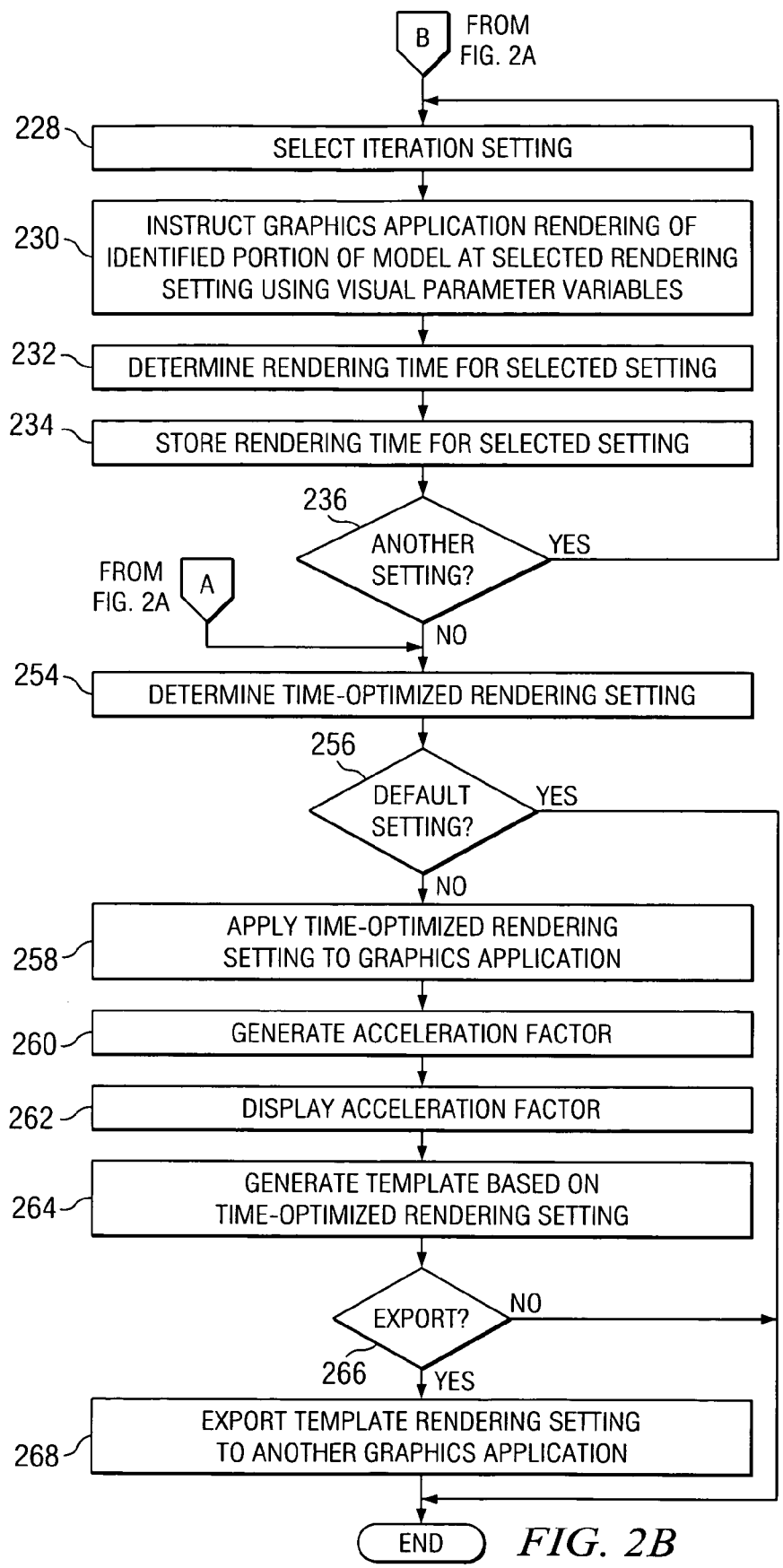

The preferred embodiments of the present invention and the advantages thereof are best understood by referring to FIGS. 1 and 2 of the drawings, like numerals being used for like and corresponding parts of the various drawings.

FIG. 1 is a diagram illustrating an embodiment of a graphics optimization system 10 in accordance with the present invention. Briefly, system 10 automatically determines a time-optimized rendering setting for a graphics application for rendering a data model of an object. For example, graphics applications generally comprise a plurality of different available rendering settings for rendering a data model using a graphics card. Different computational algorithms and memory capacities and access rates may be used for each different rendering setting. System 10 automatically determines a time-optimized rendering setting for the graphics application for rendering the data model based on a particular graphics application/graphics card combination and/or particular rendering variables for displaying the object. Thus, in some embodiments, system 10 instructs a graphics application to perform data rendering of a data model using all or a portion of the data model, using all or a particular quantity of the available data rendering settings, and/or based on user-selected data model attributes to compare and select a time-optimized rendering setting for the graphics application. In some embodiments, system 10 also comprises a graphical user interface enabling a user to input and/or select various rendering variables such that a time-optimized rendering setting for the graphics application is determined based on the selected rendering variables.

In the embodiment illustrated in FIG. 1, system 10 comprises an input device 12, an output device 14, a processor 16, a graphics card 18, and a memory 20. Input device 12 may comprise any type of device for inputting information to system 10 such as, but not limited to, a keyboard, mouse, trackpad, touch screen, or microphone. Output device 14 comprises any type of device for outputting information from system 10 such as, but not limited to, a printer, monitor, or audio device.

Graphics card 18 comprises any type of graphics card or module having components and circuitry for performing graphics rendering of graphical primitives such as, but not limited to, rasterizers, geometry accelerators, an interface, attribute processors, and memory and/or frame buffers. In the embodiment illustrated in FIG. 1, system 10 also comprises a graphics application 30, a converter 32, and an optimizer 34. Graphics application 30, converter 32, and optimizer 34 may comprise hardware, software, or a combination of hardware and software. In the embodiment illustrated in FIG. 1, graphics application 30, converter 32, and optimizer 34 are illustrated as being stored in memory 20 so as to be accessible and executable by processor 16. However, it should be understood that graphics application 30, converter 32, and optimizer 34 may be otherwise stored, even remotely, so as to be accessible and executable by processor 16.

Graphics application 30 controls the creation, manipulation, and/or rendering of graphics primitives via graphics card 18. For example, graphics application 30 defines, by way of a data model, an object to be rendered using graphics card 18 and controls the processing of the model data by graphics card 18. Converter 32 enables the conversion of various types or formats of data models to a format compatible with graphics application 30. Optimizer 34 automatically determines a time-optimized rendering setting for graphics application 30 for rendering a data model. Each rendering setting of graphics application 30 may employ a different data computation scheme and/or memory capacity and access rates. As used herein, a "rendering setting" comprises any behavioral setting of graphics application 30 for rendering and displaying a data model of an object such as, but not limited to, an immediate mode setting, a displayless mode setting, and any other type of operational setting for rendering a data model.

In the embodiment illustrated in FIG. 1, optimizer 34 comprises a compute engine 40, a graphical user interface 42, and a default data model 44. Default data model 44 comprises information representing a graphical object that may be rendered using graphics application 30 and graphics card 18. Optimizer 34 may be configured to determine a time-optimized rendering setting for graphics application 30 based on rendering default data model 44 or a different data model selected or provided by a user. Graphical user interface 42 comprises an interface enabling a user to input, select and/or receive various types of information associated with optimizer 34. Compute engine 40 interfaces with graphics application 30 and causes graphics application 30 to render information associated with a particular data model using different rendering settings and automatically determines a time-optimized rendering setting for graphics application 30 for rendering a particular data model and/or a time-optimized rendering setting based on one or more rendering variables received from a user via graphical user interface 42.

In the embodiment illustrated in FIG. 1, system 10 also comprises a database 50 having data model(s) 52, rendering settings 54, rendering variable(s) 56, template data 58, and acceleration data 60. Data model(s) 52 comprises information associated with one or more objects that may be graphically rendered using graphics application 30. It should be understood that data model(s) 52 may also be imported or accessed from another, even remote, location.

Rendering settings 54 comprise information associated with various rendering settings of graphics application 30. For example, in operation, compute engine 40 interfaces with graphics application 30 and determines or identifies various available rendering settings of graphics application 30. In the embodiment illustrated in FIG. 1, rendering settings 54 comprises a default setting 68, iteration settings 70, and a time-optimized setting 72. Default setting 68 comprises information associated with a default rendering setting of graphics application 30. Iteration settings 70 comprise information associated with other rendering settings in addition to default setting 68 available by graphics application 30 for rendering a data model. For example, iteration settings 70 may comprise information identifying various parameters of each available rendering setting of graphics application 30 in addition to default setting 68. Iteration settings 70 may also comprise information associated with each rendering setting used or selected by optimizer 34 to determine the time-optimized rendering setting for graphics application 30. For example, optimizer 34 may be configured to determine a time-optimized rendering setting for graphics application 30 based on all or a portion of the available rendering settings of graphics application 30. Thus, iteration settings 70 may also comprise timing information associated with rendering data model 44, 52 using each available or selected rendering setting.

Time-optimized setting 72 comprises information associated with an optimal time-based rendering setting for graphics application 30 as determined by compute engine 40. For example, in operation, compute engine 40 instructs graphics application 30 to render all or a portion of default data model 44 and/or data model(s) 52 using default setting 68 and one or more iteration settings 70. Compute engine 40 monitors and stores a rendering time associated with settings 68, 70 and determines time-optimized setting 72 from the rendering times associated with settings 68, 70, thereby identifying an optimum time-based performance setting for graphics application 30.

Rendering variables 56 comprise information associated with variables input or selected by a user of system 10, such as via graphical user interface 42, used for rendering model 44, 52. For example, in the embodiment illustrated in FIG. 1, rendering variables 56 comprise an iteration limitation 80, a duration limitation 82, graphics application data 84, graphics card data 86, and visual parameters 88. Iteration limitation 80 comprises information associated with a quantity of different rendering settings available by graphics application 30. For example, in operation, a user of system 10 may select, via user interface 42, a particular quantity of different available rendering settings of graphics application 30 for evaluation to determine time-optimized setting 72. Thus, if iteration limitation 80 is set or selected to a maximum quantity, optimizer 34 evaluates all available rendering settings of graphics application 30. If iteration limitation 80 is set or selected to a quantity less than all available rendering settings of graphics application 30, a corresponding quantity of the available rendering settings of graphics application 30 are evaluated by optimizer 34 to determine time-optimized setting 72. For example, in some embodiments, optimizer 34 may be configured to randomly select a particular quantity of the available rendering settings of graphics application 30 corresponding to iteration limitation 80 selected by the user.

Duration limitation 82 comprises information associated with an evaluation time for optimizer 34 to determine time-optimized setting 72. For example, in operation, a user of system 10 may select, via user interface 42, a particular duration of data model 44,52 evaluation to determine time-optimized setting 72. Thus, if duration limitation 82 is set or selected to evaluate an entire model 44, 52, compute engine 40 instructs graphics application 30 render the entire model 44, 52 and determines time-optimized setting 72 by comparing rendering times for each rendering iteration resulting from the rendering of the entire data model 44, 52. If duration limitation 82 is set or selected to a setting less than the entire model 44, 52, compute engine 40 instructs graphics application 30 to render a corresponding portion of data model 44, 52 relating to duration limitation 82 selected by the user. Thus, for example, for duration limitation 82 settings of "short," "medium," and "long," the "short" setting may be selected to evaluate approximately 25% of data model 44, 52, the "medium" setting may be selected to evaluate approximately 50% of data model 44, 52, and the "long" setting may be selected to evaluate the entire data model 44, 52. Thus, in operation, duration limitation 82 may be selected by a user to provide a time constraint for determining time-optimized setting 72.

Graphics application data 84 comprises information associated with graphics application 30 used for rendering data model 44,52. For example, graphics application data 84 may comprise information associated with a manufacturer, model, and/or type of graphics application 30 and/or the available rendering settings for graphics application 30. Additionally, graphics application data 84 may comprise information associated with a variety of different types of graphics applications such that a user may select a particular graphics application for determining time-optimized setting 72 if different graphics applications 30 are available to render data model 44,52. Thus, in operation, compute engine 40 may be configured to automatically identify each available graphics application 30 for rendering data model 44,52 and the available rendering settings of each available graphics application 30. Alternatively, or additionally, a user may select a particular graphics application via user interface 42 (i.e., drop-down menu or selectable icon) for determining time-optimized setting 72.

Graphics card data 86 comprises information associated with graphics card 18. For example, graphics card data 86 may comprise information associated with a manufacturer, model, and/or type of graphics card 18 for performing rendering operations on data model 44, 52. In operation, compute engine 40 may be configured to automatically identify the type of graphics card 18 used by graphics application 30 to perform rendering operations for data models 44, 52. System 10 may also be configured to enable user selection of graphics card 18 from a listing of different available graphics cards (i.e., drop-down menu or selectable icon) for performing rendering operations on data model 44, 52.

Visual parameters 88 comprise information associated with visual characteristics of data models 44, 52 to be displayed resulting from the rendering operation. For example, visual parameters 88 may comprise highlight/unhighlight, wire frame, shaded, perspective, face analysis, and other types of visual characteristics associated with the display of a data model 44, 52. Thus, in some embodiments, the user of system 10 selects one or more visual parameters 88 via user interface 42 to be used by graphics application 30 for rendering data models 44, 52 and determining time-optimized setting 72. Therefore, the user of system 10 may select desired visual parameters 88 for rendering a particular data model 44, 52 such that time-optimized setting 72 is determined by optimizer 34 corresponding to the select visual parameters 88. Thus, in operation, if particular data model attributes are important to a user for displaying a particular data model, the user may select the corresponding visual parameters 88, and time-optimized setting 72 is determined by optimizer 34 corresponding to the selected visual parameters 88. Therefore, system 10 is dynamically configured to be responsive to each user's particular rendering desires.

Template data 58 comprises information associated with a template generated by compute engine 40 based on an evaluation of the various rendering settings of graphics application 30. For example, in the embodiment illustrated in FIG. 1, template data 58 comprises a time-optimized template 96 based on time-optimized setting 72 for graphics application 30. Thus, in operation, optimizer 34 determines and identifies a rendering setting for graphics application 30 corresponding to time-optimized setting 72 and generates template 96 for graphics application 30. Template 96 may then be exported by optimizer 34 to other graphics applications. For example, in a network computer environment, optimizer 34 may determine time-optimized setting 72 for a particular data model 44, 52 based on a particular graphics application 30 and corresponding particular graphics card 18. Template 96 may then be exported to other network computer stations such that a corresponding rendering setting may be automatically applied to graphics application 30 residing on other network computer systems.

Acceleration data 60 comprises information associated with performance results of graphics application 30 determined by optimizer 34. For example, in the embodiment illustrated in FIG. 1, acceleration data 60 comprises an acceleration factor 98. Acceleration factor 98 comprises a numerical or other type of figure indicating the performance increase of graphics application 30 based upon the rendering time period for default rendering setting 68 and the rendering time period based on time-optimized rendering setting 72. For example, acceleration factor 98 may comprise a percentage increase or other indication of enhanced rendering performance based on time-optimized rendering setting 72 related to default rendering setting 68.

In operation, according to some embodiments, optimizer 34 generates graphical user interface 42 to enable a user to input and/or select various rendering variables 56 for determining time-optimized setting 72 corresponding to graphics application 30. For example, the user may have the option of selecting default data model 44 or a particular data model 52 for evaluating rendering settings of graphics application 30. The user may also have the option of setting iteration limitation 80 for evaluating a predetermined quantity or portion of different available rendering settings associated with graphics application 30. The user may also have the option of selecting duration limitation 82 for setting a predetermined time period for evaluating each rendering setting of graphics application 30 for a particular data model 44, 52.

As described above, optimizer 34 may automatically interface with graphics application 30 and/or graphics card 18 to identify the corresponding types and/or versions of graphics application 30 and/or graphics card 18. The user may also have the option of selecting, via user interface 42, a particular graphics application 30 and/or graphics card 18. For example, a particular computer work station or other computing system may have multiple graphics applications 30 and/or graphics cards 18 available for rendering a particular data model 44, 52. Additionally, optimizer 34 may also be configured to perform rendering setting evaluations for a variety of different types of graphics application 30 and/or graphics cards 18 such that a user may have the option of selecting a particular graphics application 30 and/or graphics card 18 for rendering data model 44,52.

The user may also select one or more visual parameters 88 for rendering a particular data model 44, 52. For example, particular visual characteristics of data model 44, 52 may be desired by the user for determining a time-optimized rendering setting 72 for graphics application 30. Thus, the user, via user interface 42, may select one or more types of visual characteristics used by graphics application 30 to render the particular data model 44, 52 and time-optimized setting 72 is determined by optimizer 34 based on the selected visual parameters 88.

Compute engine 40 interfaces with graphics application 30 and identifies default rendering setting 68 for graphics application 30. Compute engine 40 instructs graphics application 30 to render data model 44, 52 using default rendering setting 68 corresponding to duration limitation 82. For example, based on duration limitation 82, compute engine 40 instructs graphics application 30 to render all or a portion of data model 44, 52 corresponding to duration limitation 82. Compute engine 40 monitors and records a time period corresponding to the rendering of data model 44, 52 using default rendering setting 68.

Compute engine 40 also instructs graphics application 30 to render data model 44, 52 using additional iteration rendering settings 70 corresponding to iteration limitation 80. For example, in some embodiments, compute engine 40 interfaces with graphics application 30 and identifies each available rendering setting of graphics application 30. All or a portion of available iteration rendering settings 70 of graphics application 30 may be evaluated for all or a portion of data model 44, 52 corresponding to duration limitation 82 to determine time-optimized rendering setting 72 for graphics application 30. Thus, for example, if iteration limitation 80 is set to a maximum setting, compute engine 40 instructs graphics application 30 to render data model 44, 52 using each iteration rendering setting 70 available by graphics application 30 and stores the rendering time period corresponding to each iteration rendering setting 70. If a less than maximum iteration limitation 80 is selected by the user, compute engine 40 selects a portion of available iteration rendering settings 70 and instructs graphics application 30 to render data model 44, 52 using each of the selected iteration rendering settings 70. In some embodiments, compute engine 40 may randomly select a portion of available iteration rendering settings 70 of graphics application 30. In other embodiments, a predetermined order or hierarchy of iteration rendering settings 70 may be selected by compute engine 40 to determine time-optimized setting 72. Compute engine 40 stores the rendering time period associated with each selected iteration rendering setting 70. Compute engine 40 compares rendering time periods for each evaluated iteration rendering setting 70 and determines time-optimized rendering setting 72 for graphics application 30. In some embodiments, optimizer 34 may be configured to automatically apply time-optimized rendering setting 72 to graphics application 30. In other embodiments, optimizer 34 may apply time-optimized rendering setting 72 to graphics application 30 upon a request by the user (i.e., via user interface 42).

Optimizer 34 also generates time-optimized template 96 based on time-optimizer rendering setting 72. Optimizer 34 may be configured to automatically export template 96 to other network computer systems such that time-optimized rendering setting 72 may be automatically applied to other graphics applications 30 residing on other network computer systems. Additionally, or alternatively, exportation of template 96 to other graphics applications 30 residing on other computer systems may be performed at the request of the user (i.e., via user interface 42). Optimizer 34 also generates acceleration factor 98 based on rendering time periods associated with default rendering setting 68 and time-optimized rendering setting 72. Optimizer 34 may display acceleration factor 98 to the user via user interface 42.

FIG. 2 is a flow diagram illustrating an embodiment of a graphics optimization method in accordance with the present invention. The method begins at block 200, where optimizer 34 interfaces with graphics application 30 to identify a type of graphics application 30. For example, as described above, optimizer 34 may be configured to automatically identify the manufacturer, version, model, and/or other information associated with graphics application 30 to be used for rendering a particular data model. At block 202, optimizer 34 interfaces with graphics card 18 and identifies a particular type of graphics card 18 to be used by graphics application 30 for rendering a particular data model.

At block 204, optimizer 34 identifies default rendering setting 68 for graphics application 30. At decisional block 206, a determination is made whether default data model 44 will be used for determining time-optimized rendering setting 72. If default data model 44 will not be used for determining time-optimized rendering setting 72, the method proceeds from block 206 to block 208, where optimizer 34 receives a selection of a desired data model 52 from the user. As described above, data model 52 may be retrieved or accessed from database 50 or may be otherwise imported or accessed from another location. If default data model 44 will be used for determining time-optimized rendering setting 72, the method proceeds from block 206 to block 210.

At block 210, optimizer 34 receives iteration limitation 80 indicating a quantity of different available rendering settings of graphics application 30 that will be used to determine time-optimized rendering setting 72. At block 212, optimizer 34 receives duration limitation 82 indicating a rendering time period for determining time-optimized rendering setting 72. For example, duration limitation 82 may indicate a particular portion of data model 44, 52 to be rendered for determining time-optimized rendering setting 72, a particular time period for completing a determination of time-optimized rendering setting 72, or any other criteria for controlling or setting a desired time period for determining time-optimized rendering setting 72.

At block 214, optimizer 34 receives visual parameters 88 for rendering data model 44, 52. For example, as described above, visual parameters 88 may indicate various types of visual characteristics of a rendered object such that graphics application 30 renders data model 44, 52 according to the selected visual characteristics. At block 216, optimizer 34 identifies the portion of data model 44, 52 to be rendered corresponding to durational limitation 82. At block 218, optimizer 34 identifies the various different graphics application 30 rendering settings available for rendering data model 44, 52.

At block 220, optimizer 34 instructs graphics application 30 to render the identified portion of data model 44, 52 using default rendering setting 68 and corresponding visual parameters 88. At block 222, optimizer 34 determines a rendering time for the default rendering setting 68. At block 224, optimizer 34 stores the rendering time for default rendering setting 68.

At decisional block 226, a determination is made whether iteration limitation 80 reflects a maximum quantity of different iteration rendering settings 70 for graphics application 30. If iteration limitation 80 reflects a maximum or total quantity of iteration rendering setting 70 for graphics application 30, the method proceeds to block 228, where optimizer 34 selects one of the available iteration rendering settings 70 or graphics application 30. At block 230, optimizer 34 instructs graphics application 30 to render the identified portion of data model 44, 52 using the selected iteration rendering setting 70 and selected visual parameters 88. At block 232, optimizer 34 determines a rendering time for the selected iteration rendering setting 70. At block 234, optimizer 34 stores the rendering time for the corresponding selected iteration rendering setting 70. At decisional block 236, a determination is made whether another iteration rendering setting 70 is available for rendering data model 44, 52. If another iteration rendering setting 70 is available, the method returns to block 228. If another iteration rendering setting 70 is not available, the method proceeds from block 236 to block 254.

If iteration limitation 80 does not indicate a maximum or total quantity of iteration rendering setting 70 at block 226, the method proceeds from block 226 to block 240, where optimizer 34 identifies a particular quantity of iteration rendering settings 70 corresponding to iteration limitation 80. At block 242, optimizer 34 randomly selects a particular iteration rendering setting 70 of graphics application 30. At block 244, optimizer 34 instructs graphics application 30 to render the identified portion of data model 44, 52 using the selected iteration rendering setting 70 and visual parameters 88.

At block 246, optimizer 34 determines a rendering time for the selected iteration rendering setting 70. At block 248, optimizer stores the rendering time for the corresponding iteration rendering setting 70. At decisional block 250, a determination is made whether another iteration rendering setting 70 is to be used based on iteration limitation 80. If another iteration rendering setting 70 is to be used, the method proceeds from block 250 to block 252, where optimizer 34 randomly selects another iteration rendering setting 70. The method then returns to block 244. If another iteration rendering setting 70 is not to be used based on iteration limitation 80, the method proceeds from block 250 to block 254.

At block 254, optimizer 34 determines time-optimized rendering setting 72 for graphics application 30. For example, as described above, optimizer 34 may compare rendering times for each evaluated rendering setting of graphics application 30 to determine the optimum time-based rendering performance setting for graphics application 30. At decisional block 256, a determination is made whether time-optimized rendering setting 72 is equivalent to default rendering setting 68. If time-optimized rendering setting 72 is equivalent to default rendering setting 68, the method ends. If time-optimized rendering setting 72 is not equivalent to default rendering setting 68, the method proceeds from block 256 to block 258, where optimizer 34 automatically applies time-optimized rendering setting 72 to graphics application 30.

At block 260, optimizer 34 generates acceleration factor 98 based on the rendering time using default rendering setting 68 and the rendering time using time-optimized rendering setting 72. At block 262, optimizer 34 displays acceleration factor 98 to the user via graphical user interface 42. At block 264, optimizer 34 generates time-optimized template 96 based on time-optimized rendering setting 72. At decisional block 266, a determination is made whether exportation of time-optimized template 96 is desired. If exportation of time-optimized template 96 is desired, the method proceeds from block 266 to block 268, where optimizer 34 exports template 96 to another graphics application. If exportation of time-optimized template 96 is not desired, the method ends.

Preferably, all or a portion of optimizer 34 is implemented in software and can be adapted to run on different platforms and operating systems. In particular, logical functions implemented by compute engine 40 and/or interface 42 may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semi-conductor system, apparatus, device, or propagation medium. It will be appreciated that, in some embodiments, functionality can be performed in a different order, simultaneously, or be omitted, without deviating from the scope of the present invention.

Thus, embodiments of the present invention provide an efficient and dynamic means for determining a time-optimized rendering setting for a graphics application based on a graphics card used by the graphics application to render a data model and/or rendering variables used by the graphics application to render a data model. Embodiments of the present invention also enable a user to select a particular graphics application and/or graphics card for determining a time-optimized rendering setting for the selected graphics application for rendering a data model. Embodiments of the present invention also enable a user to select desired visual parameter variables for the data model and, based on the selected visual parameter variables, a time-optimized rendering setting for a graphics application is determined.

What is claimed is:

1. A graphics optimization system, comprising:
   a graphics application adapted to render a data model for presentation via a graphics card using a plurality of different data rendering settings; and
   an optimizer adapted to interface with the graphics application to determine a time period for the graphics application to render at least a portion of the data model using at least two of the plurality of different data rendering settings and automatically determine a time-optimized data rendering setting for the graphics application from the plurality of different data rendering settings.

2. The system of claim 1, wherein the optimizer is adapted to automatically identify a type of the graphics card.

3. The system of claim 1, wherein the optimizer is adapted to automatically identify a type of the graphics application.

4. The system of claim 1, wherein the optimizer is adapted to cause the graphics application to render the data model using a particular quantity of the plurality of different data rendering settings.

5. The system of claim 1, wherein the optimizer is adapted to receive from a user a selection of a visual parameter variable for the data model.

6. The system of claim 1, wherein the optimizer is adapted to compute an acceleration increase factor based on the time-optimized rendering setting and a default data rendering setting of the graphics application.

7. The system of claim 1, wherein the optimizer is adapted to generate a template based on the time-optimized data rendering setting.

8. The system of claim 1, wherein the optimizer is adapted to export a template based on the time-optimized data rendering setting to another graphics application.

9. The system of claim 1, wherein the optimizer is adapted to receive a selection of the data model from a user.

10. The system of claim 1, wherein the optimizer is adapted to determine the time-optimized data rendering setting using a default data model.

11. The system of claim 1, wherein the optimizer is adapted to receive from a user a duration limitation for determining the time-optimized data rendering setting.

12. The system of claim 1, wherein the optimizer is adapted to receive from a user an iteration limitation for determining the time-optimized data rendering setting.

13. The system of claim 1, wherein the optimizer is adapted to automatically apply the time-optimized data rendering setting to the graphics application.

14. The system of claim 1, wherein the optimizer is adapted to randomly select a particular quantity of the plurality of different data rendering settings for determining the time-optimized data rendering setting.

15. The system of claim 1, wherein the optimizer is adapted to receive from a user a selection of the graphics application from a listing of different graphics applications.

16. The system of claim 1, wherein the optimizer is adapted to receive from a user a selection of the graphics card from a listing of different graphics cards.

17. The system of claim 1, wherein the optimizer is adapted to cause the graphics application to render a predetermined portion of the data model using the plurality of different data rendering settings.

18. A graphics optimization system, comprising:
means for rendering a data model for presentation via a graphics card using a plurality of different data rendering settings; and
means for interfacing with the rendering means to determine a time period for the rendering means to render at least a portion of the data model using at least two of the plurality of different data rendering settings and automatically determine a time-optimized data rendering setting for the rendering means from the plurality of different data rendering settings.

19. The system of claim 18, further comprising means for receiving from a user at least one visual parameter variable associated with the data model.

20. The system of claim 18, further comprising means for determining an acceleration increase factor based on the time-optimized data rendering setting and a default data rendering setting of the rendering means.

21. The system of claim 18, further comprising means for exporting a template of the time-optimized data rendering setting to another rendering means.

22. The system of claim 18, wherein the interfacing means comprises means for selecting a particular quantity of the plurality of different data rendering settings for determining the time-optimized data rendering setting.

23. A graphics optimization method, comprising:
instructing a graphics application to render a data model for presentation via a graphics card using a plurality of different data rendering settings; and
automatically determining a time period for the graphics application to render the data model using at least two of the plurality of different data rendering settings and determining time-optimized data rendering setting for the graphics application from the plurality of different data rendering settings.

24. The method of claim 23, further comprising automatically applying the time-optimized data format setting to the graphics application.

25. The method of claim 23, further comprising receiving from a user a visual parameter variable associated for the data model.

26. The method of claim 23, further comprising accessing a default data model for determining the time-optimized data format setting.

27. The method of claim 23, further comprising receiving from a user a selection of the data model for determining the time-optimized data format setting.

28. The method of claim 23, further comprising receiving from a user a duration limitation for determining the time-optimized data format setting.

29. The method of claim 23, further comprising receiving from a user an iteration limitation for determining the time-optimized data rendering setting.

30. The method of claim 23, further comprising determining an acceleration increase factor based on the time-optimized data rendering setting and a default data rendering setting of the graphics application.

31. The method of claim 23, further comprising generating a template based on the time-optimized format setting for the graphics application.

32. The method of claim 23, further comprising exporting a template based on the time-optimized format setting to another graphics application.

33. The method of claim 23, further comprising identifying a type of graphics card associated with the graphics application.

34. The method of claim 23, further comprising identifying a type of graphics application for rendering the data model.

35. The method of claim 23, further comprising selecting a particular quantity of the plurality of different data rendering settings for determining the time-optimized data rendering setting.

36. The method of claim 23, further comprising randomly selecting a portion of the plurality of different data rendering settings for determining the time-optimized data rendering setting.

37. The method of claim 23, further comprising receiving from a user a selection of the graphics application from a listing of different graphics applications.

38. The method of claim 23, further comprising receiving from a user a selection of the graphics card from a listing of different graphics cards.

39. The method of claim 23, further comprising instructing the graphics application to render a predetermined portion of the data model to determine the time-optimized data rendering setting.

40. A graphics optimization system, comprising:
an interface adapted to receive from a user at least one data rendering variable associated with rendering a data model via a graphics application; and
an optimizer adapted to determine a time period for the graphics application to render, using at least two different rendering settings, at least a portion of the data model with the at least one data rendering variable and automatically determine a time-optimized data rendering setting for the graphics application based on the data rendering variable.

41. The system of claim 40, wherein the data rendering variable comprises a visual parameter variable.

42. The system of claim 40, wherein the optimizer is adapted to determine the time-optimized data rendering setting based on a type of graphics card used by the graphics application.

43. The system of claim 40, wherein the data rendering variable comprises a duration limitation for determining the time-optimized data rendering setting.

44. The system of claim 40, wherein the data rendering variable comprises an iteration limitation for determining the time-optimized data rendering setting.

45. The system of claim 40, wherein the optimizer is adapted to randomly select a particular quantity of a plurality of different data rendering settings of the graphics application for determining the time-optimized data rendering setting.

46. The system of claim 40, wherein the interface is adapted to receive from the user a selection of the data model for determining the time-optimized data rendering setting.

47. The system of claim 40, wherein the optimizer is adapted to generate a template based on the time-optimized data rendering setting.

48. The system of claim 40, wherein the optimizer is adapted to export a template based on the time-optimized data rendering setting to another graphics application.

49. The system of claim 40, wherein the optimizer is adapted to automatically apply the time-optimized data rendering setting to the graphics application.

50. The system of claim 40, wherein the optimizer is adapted to instruct the graphics application to render a predetermined portion of the data model using the data rendering variable to determine the time-optimized data rendering setting.

51. A non-transitory computer-readable medium having stored thereon an instruction set to be executed, the instruction set, when executed by a processor, causes the processor to:
   instruct a graphics application to render a data model for presentation via a graphics card using a plurality of different data rendering settings; and
   automatically determine a time period for the graphics application to render the data model using at least two of the plurality of different data rendering settings and determine a time-optimized data rendering setting for the graphics application from the plurality of different data rendering settings.

52. The computer-readable medium of claim 51, wherein the instruction set, when executed by the processor, causes the processor to instruct the graphics application to render a predetermined portion of the data model to determine the time-optimized data rendering setting.

53. The computer-readable medium of claim 51, wherein the instruction set, when executed by the processor, causes the processor to instruct the graphics application to randomly select a particular quantity of the plurality of different data rendering settings to determine the time-optimized data rendering setting.

54. The computer-readable medium of claim 51, wherein the instruction set, when executed by the processor, causes the processor to generate a template of the time-optimized data rendering setting.

55. The computer-readable medium of claim 51, wherein the instruction set, when executed by the processor, causes the processor to export a template based on the time-optimized data rendering setting to another graphics application.

56. The computer-readable medium of claim 51, wherein the instruction set, when executed by the processor, causes the processor to instruct the graphics application to render the data model corresponding to a predetermined duration limitation.

57. The computer-readable medium of claim 51, wherein the instruction set, when executed by the processor, causes the processor to generate an interface adapted to receive from a user at least one visual parameter variable for rendering the data model.

58. The computer-readable medium of claim 51, wherein the instruction set, when executed by the processor, causes the processor to automatically apply the time-optimized data rendering setting to the graphics application.

59. A non-transitory computer-readable medium having stored thereon an instruction set to be executed, the instruction set, when executed by a processor, causes the processor to:
   generate an interface adapted to receive from a user at least one data rendering variable associated with rendering a data model via a graphics application; and
   automatically determine a time period for the graphics application to render, using at least two different rendering settings, at least a portion of the data model with the at least one data rendering variable to determine a time-optimized data rendering setting for the graphics application based on the data rendering variable.

60. The computer-readable medium of claim 59, wherein the instruction set, when executed by the processor, causes the processor to instruct the graphics application to render a predetermined portion of the data model using the data rendering element.

61. The computer-readable medium of claim 59, wherein the instruction set, when executed by the processor, causes the processor to instruct the graphics application to render the data model using a particular quantity of a plurality of different data rendering settings of the graphics application.

62. The computer-readable medium of claim 59, wherein the instruction set, when executed by the processor, causes the processor to instruct the graphics application to render the data model corresponding to a predetermined duration limitation.

63. The computer-readable medium of claim 59, wherein the instruction set, when executed by the processor, causes the processor to generate a template based on the time-optimized data rendering setting.

64. The computer-readable medium of claim 59, wherein the instruction set, when executed by the processor, causes the processor to export a template of the time-optimized data rendering setting to another graphics application.

65. The computer-readable medium of claim 59, wherein the instruction set, when executed by the processor, causes the processor to determine an acceleration increase factor based on the time-optimized data rendering setting and a default data rendering setting of the graphics application.

66. The computer-readable medium of claim 59, wherein the instruction set, when executed by the processor, causes the processor to automatically apply the time-optimized data rendering setting to the graphics application.

* * * * *